June 18, 1940.  L. KAMPCZYK  2,204,935
MEANS FOR FASTENING MATRICES IN DUPLICATORS
Filed Feb. 1, 1937
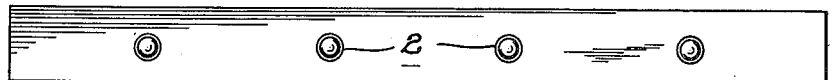
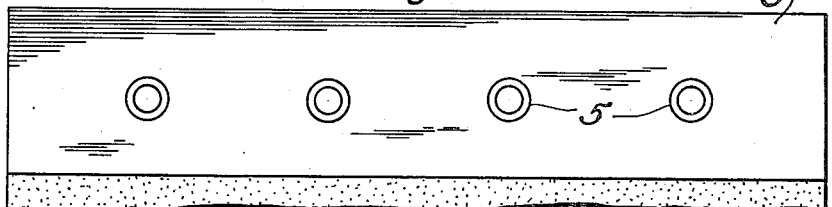
  
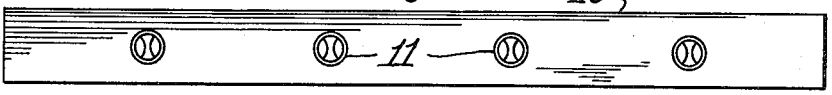
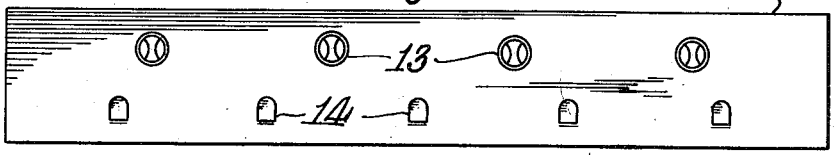
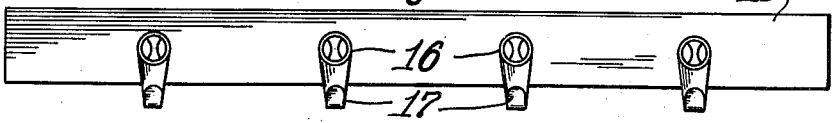
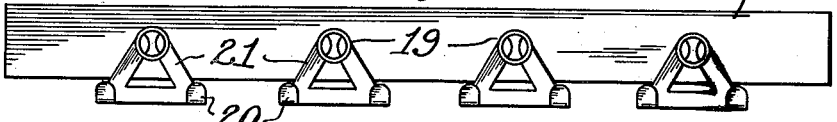
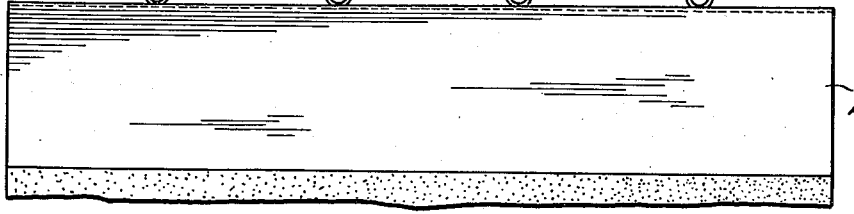
INVENTOR
Leonhard Kampczyk
BY Arthur J. Stephens
ATTORNEY Patented June 18, 1940

2,204,935

UNITED STATES PATENT OFFICE 2,204,935

MEANS FOR FASTENING MATRICES IN DUPLICATORS

Leonhard Kampczyk, Hanover-Kirchrode, Germany, assignor to Geha Aktiengesellschaft, Hanover, Germany, a German company Application February 1, 1937, Serial No. 123,456
In Germany February 5, 1936

6 Claims. (Cl. 101—415.1)

A problem of the duplicating industry is to provide a fastening of the matrix to the pressure body, which satisfies all the requirements arising in operation. This problem is particularly difficult in the fastening of stencils which have to be fastened to rotary stencil printers. The fastening must be as firm as possible, that is to say it must not come undone of its own accord during operation. It must, however, be easily releasable in order not to hinder exchange of the stencils. It must, further, withstand mechanical stresses of tension and compression without tearing or other deformation occurring. It must, still further, make provision that the desired position does not change during working and it must moreover be of such a nature that the stencils to be attached can still be written on in the typewriter, the accounting machine or the like. It must not be forgotten finally that such a fastening device must be simple in manufacture and low in price.

Attempts have been made to solve the problem in the most manifold ways. These prior proposals are known and belong to the prior art; none of the known proposals has been completely satisfactory.

Thus it is known to fasten duplicating stencils on pins, buttons, hooks or similar projections on the holding bar of rotary stencil printers. This mode of fastening is not very advantageous. The holes at the head of the stencil adapted to fit on the fastening pins very easily become enlarged and incline to tear out. The stencil sheet accordingly easily bears crookedly on the ink carrier of the apparatus whereby the prints also become crooked; in correcting this, inconvenient folds and the like occur. Repeated use, as is nowadays required of stencils, is almost impossible. If the head of the stencil is suitably strengthened so that broadening or tearing of the stamped holes is impossible, on the one hand difficulties are encountered in putting the stencil sheet into the typewriter for writing upon it and on the other hand a particularly stiff stencil head very easily jumps off of the fastening pins, particularly in multi-drum stencil printers, in which the stencil is carried belt fashion round the drums.

To overcome the faults of the pin type of fastening many other fastening devices have been proposed. The simpler methods consist in clamping the head of the stencil in grooves or recesses or between specially arranged rails, and in other similar schemes. It has also been attempted to overcome the faults by more elaborate fastening devices, for example by separate locking of the fastening buttons, which is usually effected by the use of a cover rail, or by the arrangement of special flaps which are embedded in corresponding recesses in the fastening strip and retained by a rail. It has also been proposed to hinder a movement of the stencil or a loosening of the fastening during duplicating, by providing a relatively large number of regularly or irregularly formed pins and corresponding punched holes in the stencil head, which are arranged in a line other than a straight line parallel to the axis of the machine, or by special flaps on the stencil head which on the fastening bar of the rotary stencil printer are on the one hand inserted into guide slots and on the other hand fastened upon pins. But these fastening devices also have faults or only partially fulfill the requirements placed upon them in single drum rotary duplicators in which the stencils are not so highly stressed as in multi-drum rotary duplicators.

The main faults which appear in fastening devices which have continually become more and more involved, are the following. Owing to the outline of the fastening device it is necessary both in single drum and multi-drum rotary stencil printers, to raise the pressure roller very considerably so that it does not come into contact with the fastening device. This results in a very undesirable cam curve because the aim is naturally to bring the pressure roller against the stencil again immediately after passage of the fastening device. The stencil is thereby highly stressed and very easily damaged. Those skilled in the art have therefore for years striven to overcome this fault by various arrangements which mainly lie in the direction of a gentle application of the pressure roller. The ideal solution would be to dispense entirely with lifting of the pressure roller—that is to work with a pressure roller rotating in a stationary position—or to limit the lifting to the very least possible amount. Most of the known fastening devices also have the fault that the stencil when fastened to the rotary stencil printer does not bear closely immediately behind the fastening bar. There is therefore a space at this place between the ink carrier and the stencil which leads to the stencil being particularly easily damaged by the blow of the pressure roller. Finally it must also be borne in mind that most of the known fastening devices have, owing to their particular construction, become too expensive and accordingly can only be used on high priced rotary stencil printers, and that in a considerable number of cases the fastening device has become so difficult to operate that they are only operated with reluctance by the user.

According to the invention the known state of the art is left and a new way followed in that the union of two parts by a press stud fastening known per se is used to fasten the stencil of whatever kind to the fastening bar of the duplicator, it being understood that by "press stud fastening" fastenings of a like kind are included. In carrying out the invention it is unimportant how the press stud fastening is constructed in detail, whether the projecting part (under part) or the hollow part (upper part) is sprung. Advantageously the stencil is provided with the hollow part (upper part) while the projecting part (under part) is arranged on the fastening bar of the duplicator. In carrying out the invention it is obviously unimportant whether the stencil is directly fastened to the fastening bar of the rotary stencil duplicator, or an indirect fastening effected by the aid of auxiliary devices.

In the present invention the bar of the duplicator is always provided with one of the two press stud parts, and accordingly only a stencil head provided with corresponding press stud counter-parts can be fastened directly thereto. If now a stencil is to be used the head of which is not provided with press stud parts but with the usual holes or the like of the prior art for fastening it to the fastening bar of a duplicator, bridging over of the two fastening modes (press stud fastening and the other, prior art, fastening) must be effected by the auxiliary device. This is done by the auxiliary device being provided on the one hand with press stud parts by which the auxiliary device is fastened to the corresponding press stud parts on the fastening bar of the duplicator, and on the other hand with devices in order to permit an attachment to the duplicator of stencils provided with the differently formed fastening devices, such as stamped holes of all kinds, for example round or key hole shaped holes or the like. In this way by means of the auxiliary devices a duplicator having a fastening bar with the press stud device can be used for stencil heads of any kind.

Care must be taken in the provision of the press stud fastening that no considerable thickening occurs at the head of the stencil, which would cause difficulty in putting the stencil into the typewriter for being written upon.

Care must further be taken that the whole press stud arrangement is as flat as possible so that during duplicating with the rotary stencil printer only a very slight lifting of the pressure roller is necessary.

The arrangement is preferably such that the fastening bar of the duplicator carries the projecting part of the press stud fastening, which is advantageously of pin like form, while the stencil head is provided with the hollow press stud part, for example of eye-like form, so that the stencil head can be kept as flat as possible.

The press stud parts can be secured in the stencil head on two different principles:

1. Separate press stud parts can be secured in the stencil head.
2. The press stud parts can be produced directly of the material of the stencil head.

A combination of both is also possible.

Details of the press stud fastening will be described below with reference to the accompanying drawing which is a purely diagrammatic representation, which in the present case illustrates the essence of the invention.

Figure 1 shows the fastening bar of a rotary stencil printer equipped according to the invention, Figure 2 shows the head of a stencil for co-operation with Figure 1, Figures 3, 4 and 5 show alternative eye form press stud upper parts.

Figure 6 shows a separate strip carrying one set of press stud parts,

Figures 7, 8 and 9 show three forms of intermediate or connecting member for the use of the invention with existing stencils, Figure 10 shows a stencil head with another form of press stud under part.

Figure 1 shows the fastening bar 1 of a rotary stencil duplicator seen from above, on which four press stud parts 2 are arranged.

Figure 2 shows the head 3 of a stencil 4 with four corresponding press stud counter-parts 5 which fit correctly on the press stud parts 2 of the fastening bar 1.

The construction of the press stud upper part arranged on the stencil head, which are to be kept as flat as possible, can, as above mentioned, be of eye form. Some possibilities are illustrated in Figures 3, 4 and 5.

Figure 3 shows a flat eye with two fine wire spring 6.

Figure 4 illustrates a flat eye which consists solely of a rim 7 on each hole 8 punched in the stencil head. In this case it is necessary for the under parts of the press stud fastening arranged on the fastening bar of the duplicator to be of resilient construction.

Figure 5 shows a flat eye consisting solely of a small metal plate 9, the margin of which is slit star fashion and thus acts resiliently. In this case the press stud under parts arranged on the fastening bar of the duplicator obviously do not need to have a spring mechanism.

The eye-like press stud parts are advantageously secured 2 to 3 cms. from the upper edge of the stencil head, on the one hand to hinder tearing out and on the other to ensure easy insertion in the typewriter for writing upon, and finally in order to enable the usual card reinforcement to be dispensed with. It is obvious that in just the same way as the above described press stud fastenings, in themselves known in other fields, press stud fastenings of any other kind can be used with advantage in carrying out the invention. Any fastening of the fastening bar to the stencil head or auxiliary device on the press stud system is suitable.

The idea of the invention can also be put into practice by providing the fastening bar of the duplicator with a number of press stud under parts, as illustrated in Figure 1, while the stencil head only has stamped holes in known manner, of corresponding form and at corresponding spacing without any special reinforcement, which are put over the non-resilient press stud under parts and are secured by loose press stud upper parts, or more advantageously, as Figure 6 illustrates, by means of a strip 10 of linen, sheet metal or other suitable material carrying the press stud upper parts 11.

Figure 7 shows an intermediate or connecting member 12 as above mentioned, this auxiliary device having by way of example near one edge the press stud parts 13 and near the other edge small hooks 14 for the known plain hole fastening of the stencil.

Further embodiments of the auxiliary device are illustrated in Figures 8 and 9.

Figure 8 shows a strip 15 with four press stud counter parts 16 corresponding to those of Figure 1. These counter parts carry small hooks 17 for the known plain hole fastening of the stencil.

Figure 9 shows another strip 18 with press stud counter parts 19 corresponding to those of Figure 1, each counter part carrying a plurality of small hooks 20 on angled limbs 21.

In the embodiments of Figures 8 and 9 the auxiliary fastening devices are carried directly by the press stud parts.

Obviously just as with Figures 1–6 there are numerous possible equivalents for the auxiliary devices which need not be described just for the reason that they are equivalents.

The figures described above all relate to press stud fastenings provided on the stencil head on the first principle in which separate parts are set in the stencil head.

Press stud fastenings on the second principle in which the press stud part is produced directly in the material of the stencil head, can be constructed as follows:

The heads of the stencils in general consist of card, in many cases indeed of very thin card; often the stencil head is doubled back and secured by adhesive.

Eyes with spring tongues such as is shown in Figure 5 can be directly stamped out in the stencil head. These holes with spring tongues stamped out directly in the stencil head act as press stud upper parts. To reinforce them they may be lacquered or provided with a sheet metal rim.

Stamped thin metal plates as shown in Figure 5 can also be inserted, in which case a combination of both principles is obtained. Since as stated above the stencil head is often doubled back and secured by adhesive the insertion of such plates presents no difficulties. When such stamped plates are inserted, the stencil head can be of quite thin card or even of paper.

To show that any arrangement on the press stud system is suitable for carrying out the present invention, attention is directed to the following embodiment.

The hollow parts of the press stud fastening can be formed for example as resilient wire loops 22 and these arranged for example at the upper edge of the stencil head 23, as shown in Figure 10. These wire loops make it possible to fasten the stencil to correspondingly formed press stud under parts.

This embodiment will merely indicate that it is by no means necessary for the press stud upper parts always to be at a certain distance from the edge of the stencil head, but that the provision of the press stud upper parts at the edge of the stencil head is possible.

The use of the press stud fastening for stencils on rotary stencil printers, overcomes all faults which arise to a smaller or greater extent with the fastenings hitherto known for this purpose. In the first place the invention results in a manipulation which can be carried out by any unskilled person without special instruction. The press stud fastening further has the advantage that the stencil is positively fastened straight, that it is fixed immovably in all directions, that during work it can therefore neither lift nor loosen, and that even with repeated use of the stencil the press stud upper parts do not enlarge. Further the stencil can be particularly easily inserted in the typewriter because the card does not require to be reinforced; finally during the duplicating operation it bears directly and is therefore not exposed to particular stresses at one place, so that owing to the flat form of the fastening device the pressure roller only needs to be lifted very slightly—in some constructions of apparatus indeed, not at all. Apart from this the invention has the advantage as compared with the stencil fastening devices on rotary stencil printers, which have become ever more involved, of being particularly low in cost and therefore also suitable for the simplest apparatus.

It should further be mentioned that the individual press stud elements do not have to be released one by one in removing the stencil, but that the stencil is simply pulled upwards with one hand, perpendicularly to the fastening device. In the angular relation of the stencil head with the press stud holes to the corresponding press stud under parts thereby produced, the two parts automatically spring apart. This advantage of the press stud fastening is not to be undervalued, bearing in mind that a used stencil is always soiled with duplicating ink right up to the fastening head.

What I claim is:

1. In a stencil for a rotary stencil printer, a plurality of resilient press stud hollow parts formed of the material of the stencil head, said parts being in the form of openings the peripheries of which are closed whereby the stencil must be displaced axially of the studs for securing the same on the studs and for removal therefrom.

2. In a stencil for a rotary stencil printer, a plurality of resilient press stud hollow parts formed of the material of the stencil head and lacquer reinforcing said parts, said parts being in the form of openings the peripheries of which are closed whereby the stencil must be displaced axially of the studs for securing the same on the studs and for removal therefrom.

3. In a stencil for a rotary stencil printer, a plurality of resilient press stud hollow parts formed of the material of the stencil head, and inlays reinforcing said parts, said parts being in the form of openings the peripheries of which are closed whereby the stencil must be displaced axially of the studs for securing the same on the studs and for removal therefrom.

4. A mechanism for fastening a stencil to a fastening bar of a rotary stencil printer, comprising a plurality of snap fastener studs on the fastening bar and a plurality of snap fastener counter parts formed directly in the material of the stencil, said counter parts being in the form of openings the peripheries of which are closed whereby the stencil must be displaced axially of the studs for securing the same on the studs and for removal therefrom.

5. A mechanism for fastening a card head of stencil to a fastening bar of a rotary stencil printer, comprising a plurality of snap fastener studs on the fastening bar and a plurality of snap fastener counter parts formed directly in the card of the stencil head, said counter parts being in the form of openings the peripheries of which are closed whereby the stencil must be displaced axially of the studs for securing the same on the studs and for removal therefrom.

6. A mechanism for fastening a card head of stencil to a fastening bar of a rotary stencil printer, comprising a plurality of snap fastener studs on the fastening bar and a plurality of snap fastener counter parts formed directly in the card of the stencil head, said counter parts being in the form of openings the peripheries of which are closed, whereby the stencil must be displaced axially of the studs for securing the same on the studs and for removal therefrom, and which are provided with radial slits to impart resiliency thereto.

LEONHARD KAMPCZYK.